(12) United States Patent
Alexander

(10) Patent No.: US 7,174,995 B1
(45) Date of Patent: Feb. 13, 2007

(54) COLLAPSIBLE TREE STAND

(76) Inventor: Billy W. Alexander, 2486 Commercial Dr., Pearl, MS (US) 39208

( * ) Notice: Subject to any disclaimer, the term of this patent is extended or adjusted under 35 U.S.C. 154(b) by 0 days.

(21) Appl. No.: 11/336,276

(22) Filed: Jan. 20, 2006

Related U.S. Application Data

(62) Division of application No. 10/357,944, filed on Feb. 4, 2003, now abandoned.

(51) Int. Cl.
*A01M 31/00* (2006.01)
(52) U.S. Cl. .................................................. 182/187
(58) Field of Classification Search ............... 182/187, 182/116; 297/16.1
See application file for complete search history.

(56) References Cited

U.S. PATENT DOCUMENTS

| | | | | |
|---|---|---|---|---|
| 4,120,379 | A | * | 10/1978 | Carter ......................... 182/187 |
| 4,579,198 | A | * | 4/1986 | Lee ............................. 182/115 |
| 4,589,522 | A | * | 5/1986 | Shelton ....................... 182/187 |
| 4,889,383 | A | * | 12/1989 | Jones ......................... 297/16.1 |
| 5,199,527 | A | | 4/1993 | Jennings |
| 5,257,677 | A | | 11/1993 | Stepp |
| 5,297,656 | A | * | 3/1994 | Amacker ..................... 182/187 |
| 5,951,101 | A | * | 9/1999 | Chen ......................... 297/16.1 |
| 6,006,864 | A | | 12/1999 | Musk |
| 6,085,868 | A | | 7/2000 | Anthony et al. |
| 6,397,973 | B1 | | 6/2002 | Woller |
| 6,571,916 | B1 | | 6/2003 | Swanson |
| 6,588,440 | B2 | | 7/2003 | Varnado |
| 6,722,472 | B2 | | 4/2004 | Berkbuegler |
| 6,883,644 | B1 | | 4/2005 | Braun et al. |

\* cited by examiner

*Primary Examiner*—Alvin Chin-Shue
(74) *Attorney, Agent, or Firm*—Lanier Ford Shaver & Payne PC; Angela Holt; Stephen H Hall

(57) ABSTRACT

A collapsible tree stand and tree stand mounting apparatus is claimed. The tree stand consists of a bottom platform and a seat mounted to a vertical support. A coupling member attached to the vertical support is mountable onto a separate tree stand mounting apparatus. The tree stand mounting apparatus has a receiver with an aperture suitable for receiving the coupling member. The fastening component is mechanically bonded to the tree stand receiver, the fastening component suitable for draping about a tree or post. The fastening component comprises a plurality of loops and a carabiner-type device, each of the plurality of loops suitable for fastening in the carabiner-type device to adjust a length of the fastening component. The tree stand receiver is first fastened to the tree or post with the backside of the receiver against the tree or post and the top facing in a downward direction. The tree stand receiver is then cammed, which causes the front side of tree stand receiver to be against the cylindrical vertical support and the top facing in an upward direction for receiving the coupling member.

15 Claims, 5 Drawing Sheets

COLLAPSIBLE TREE STAND

REFERENCE TO RELATED APPLICATIONS

This application claims priority to Non-provisional patent application U.S. Ser. No. 10/357,944, entitled "Tree Stand and Tree Stand Receiver" and filed on Feb. 4, 2003, now abandoned which is fully incorporated herein by reference.

BACKGROUND

1. Field

The present invention relates generally to devices used for observing wildlife and, in particular, to collapsible tree stand and mounting apparatus suitable for receiving and securing the tree stand about a tree.

2. Description of the Related Art

It is advantageous for outdoorsmen, such as hunters, photographers, and naturalists, to be positioned in an elevated vantage point to view wildlife from a distance and without detection. Typically, an outdoorsman positions him or herself in a tree at a height sufficient to attain a desired elevated vantage point. Many conventional tree stands that enable an outdoorsman to achieve this goal are readily available.

One type of suitable tree stand is a non-climbing tree stand. Typically, a non-climbing tree stand has a platform, such as a foot plate and/or a seat, and is fastened to a tree via a fastening device such as a cable or a chain. An outdoorsman typically climbs the tree, carrying the tree stand, to an elevated position within the tree. Once at the desired elevated position, the outdoorsman attaches the tree stand to the tree trunk using the supplied fastening device. Once fastened, the tree stand and fastening device, in combination, grips the tree, and allows the outdoorsman to sit and/or stand on the platform to observe the wildlife.

The above described conventional tree stand, although providing an elevated vantage point, is typically difficult to assemble by a user while the user is positioned up in a tree. The fastening device can be cumbersome to place around the tree, and even more unwieldy to assemble to the tree stand. Moreover, the weight of the tree stand and/or the fastening device can cause the tree stand to separate from the tree, thus making it even more arduous to securely fasten and tighten the tree stand while positioned up in the tree. Thus, there is a need for an improved fastening device that can be more easily and readily fastened and secured to a tree by a user while the user is positioned up in the tree. There is also a need for a fastening device and tree stand that fastens tightly to the tree and which provides a stable and secure platform for use by its user.

SUMMARY

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

In one embodiment, a tree stand receiving apparatus comprises a tree stand receiver and a fastening component. The tree stand receiver comprises a top, a bottom, a front side, and a back side, the tree stand receiver comprises an aperture suitable for receiving a component of a tree stand. The fastening component is mechanically bonded to the tree stand receiver, the fastening component suitable for draping about a cylindrical vertical support. The fastening component comprises a plurality of loops and a carabiner-type device, each of the plurality of loops suitable for fastening in the carabiner-type device to adjust a length of the fastening component. The tree stand receiver is first fastened to the cylindrical vertical support with the backside of the tree stand receiver against the cylindrical vertical support and the top facing in a downward direction. The tree stand receiver is then cammed, which causes the front side of tree stand receiver to be against the cylindrical vertical support and the top facing in an upward direction.

In another embodiment, a method for fastening and tightening a tree stand receiving apparatus about a cylindrical vertical support comprises: positioning a tree stand receiver against a vertical cylindrical support, the tree stand receiver having an aperture suitable for receiving a component of a tree stand, the tree stand receiver having a top, a bottom, a front side, and a back side, wherein the tree stand receiver is positioned with the back side facing the cylindrical support and the top facing downward; draping a fastening component about the cylindrical vertical support, the fastening component comprising a first segment and a second segment, the first and second segments of the fastening component mechanically bonded to the tree stand receiver; appropriately sizing the fastening component to be taut about the vertical cylindrical support; fastening the first and second segments of the fastening component; and applying a cam action on the tree stand receiver, wherein the cam action causes the front side of tree stand receiver to be against the cylindrical vertical support and the top facing in an upward direction, the cam action increases tension in the fastening component.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The following drawings incorporated in and forming a part of the specification illustrate, and together with the detailed description serve to explain the various aspects of the implementation(s) and/or embodiments of the invention and not of the invention itself.

DETAILED DESCRIPTION

The various embodiments of the present invention and their advantages are best understood by referring to FIGS. 1 through 6 of the drawings. The elements of the drawings are not necessarily to scale, emphasis instead being placed upon clearly illustrating the principles of the invention. Throughout the drawings, like numerals are used for like and corresponding parts of the various drawings.

Figure 1:
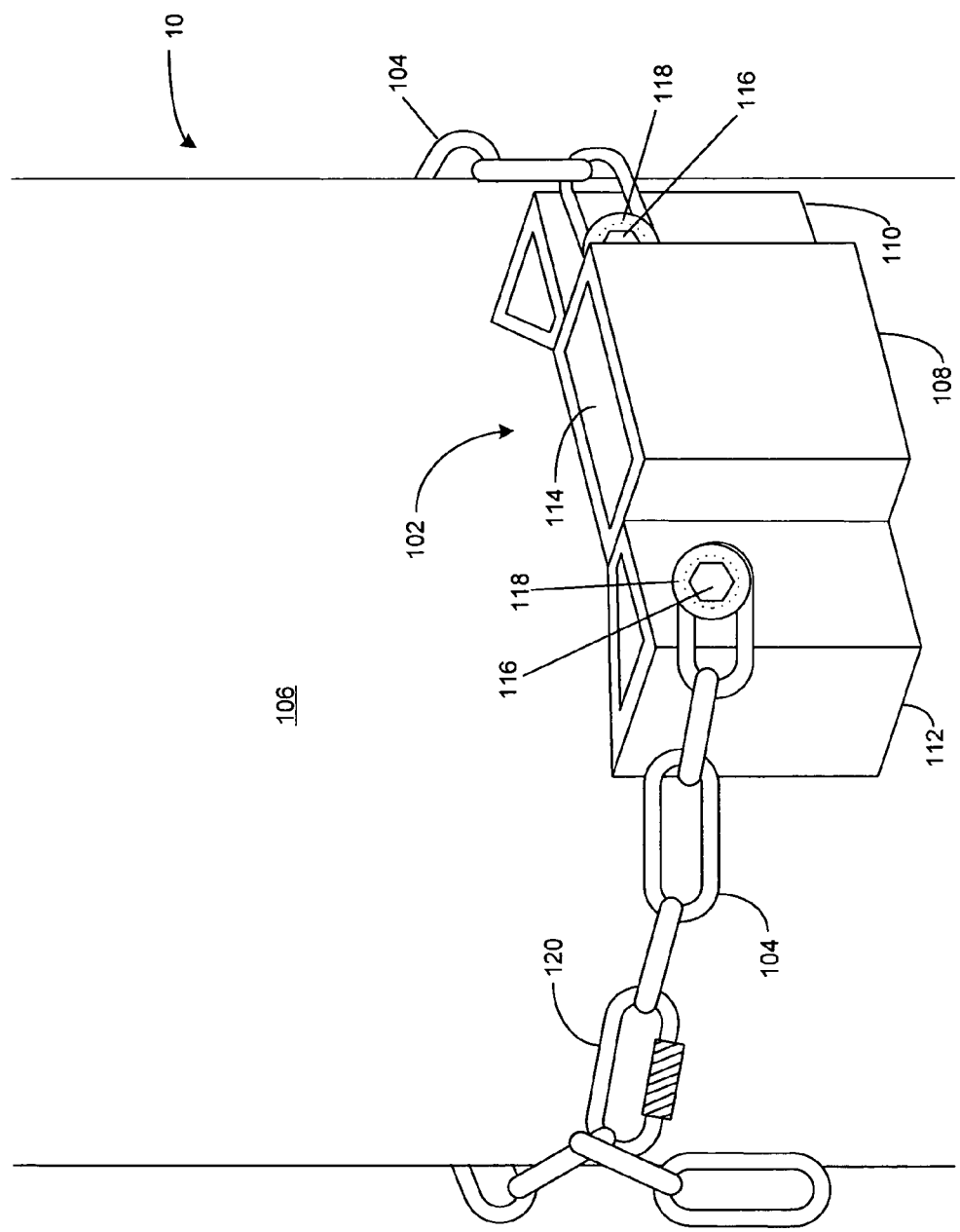
FIG. 1 illustrates a perspective view of an exemplary embodiment of a tree stand receiving apparatus.

Referring now to the drawings, FIG. 1 illustrates a perspective view of an exemplary embodiment of a tree stand receiving apparatus 10 in accordance with the present invention. When properly fastened and tightened about a tree, or other substantially cylindrical vertical support, tree stand receiving apparatus 10 facilitates the receipt and attachment of a tree stand securely about the tree, thus providing a user a stable and safe vantage point from which to observe wildlife. Tree stand receiving apparatus 10 may be made or formed from any of a variety of materials such as, by way of example and not limitation, steel, aluminum, or an appropriate alloy compound.

As depicted, tree stand receiving apparatus 10 comprises a tree stand receiver 102 to which a chain 104 is attached. Tree stand receiver 102 generally functions as a receptacle for a suitable tree stand. Chain 104 generally functions as a fastening component of tree stand receiving apparatus 10, and chain 104 is used to securely fasten tree stand receiver 102 to a tree. For example and as depicted in FIG. 1, chain 104 is positioned about a tree 106 to secure tree stand receiver 102 against at least a portion of the outer surface of tree 106.

According to one embodiment of the present invention, tree stand receiver 102 comprises an aperture section 108, a first wing section 110, and a second wing section 112. Aperture section 108 is generally shaped as a rectangular cube having four sides, a top, and a bottom. The four sides comprise a front side, a backside opposite the front side, and two lateral sides, where one lateral side is opposite the other lateral side. When properly fastened and tightened about a tree as shown in FIG. 1, the front side of aperture section 108 generally faces in a direction toward the tree while the backside of aperture section 108 generally faces in a direction away from the tree. When so positioned, the top of aperture section 108 generally faces upward toward the sky and away from the ground while the bottom of aperture section 108 generally faces downward toward the ground.

Aperture section 108 comprises an aperture 114 that extends down the length of aperture section 108 from the top and through the bottom of aperture section 108. Aperture 114 functions to receive a section of a tree stand, thus, allowing tree stand receiver 102, once properly fastened and tightened about a tree using chain 104 or other appropriate fastening device, to secure the received tree stand about the tree.

As shown in FIG. 1, aperture 114 is shaped similar to aperture section 108, in this case, a generally rectangular cube cavity. Furthermore, aperture 114 generally extends through the middle of aperture section 108. In other embodiments, aperture 114 can be of a general shape that is suitable for receiving a section of a tree stand, and the shape of aperture 114 need not be substantially similar to aperture section 108. It is appreciated that aperture 114 need not extend through the bottom of aperture section 108, but, may extend down a portion of the length of aperture section 108 from the top and terminate before reaching the bottom of aperture section 108.

In one embodiment of the present invention, first wing section 110 and second wing section 112 are integral to aperture section 108. In such embodiment, the first and second wing sections 110 and 112 may be extruded as a single piece with the aperture section 108 or they may all be formed together. As illustrated in FIG. 1, first wing section 110 is positioned at and extends from one of the lateral sides of aperture section 108 and second wing section 112 is positioned at and extends from the opposing one of the lateral sides of aperture section 108. In relation to aperture section 108, first wing section 110 and second wing section 112 are substantial mirror images of each other. In other embodiments, first wing section 110 and second wing section 112 can be mechanically attached or bonded, for example, welded, to their respective lateral sides of aperture section 108 to form tree stand receiver 102.

Each wing section 110, 112 is generally shaped as a trapezoidal cube having four sides, a top, and a bottom. The four sides comprising the general trapezoid shape comprise a front side, a backside opposite the front side, a short base, and a long base positioned opposite the short base and of a length longer than the short base. As depicted in FIG. 1, each wing section 110, 112 is integrated with or mechanically attached to aperture section 108 such that the front sides of wing sections 10, 112 and aperture section 108 generally shapes or forms the letter "C" or the letter "V" having a substantially flat bottom instead of its customary acute bottom. Worded another way, the front sides of wing sections 10, 112 and aperture section 108 forms a yoke-like shape and, when properly fastened and tightened about tree 106, the front sides of wing sections 110, 112 and aperture section 108 at least partly straddle tree 106.

Stated differently, the short base of each wing section 110, 112 is generally formed or positioned at its respective one lateral side of aperture section 108, and the long base is generally formed or positioned opposite the short base and away from the respective lateral side of aperture section 108 where the short base is formed or positioned. Also, the front side of each wing section 110, 112 extends away from its respective short base at a generally obtuse angle and, thus, meets or joins its respective long base at a generally acute angle. When so formed or positioned, the top of wing sections 10, 112 generally face in the same direction as the top of aperture section 108, and the bottom of wing sections 10, 112 generally face in the same direction as the bottom of aperture section 108. It is appreciated that the front sides of wing sections 110, 112 and aperture section 108 may form a generally arcuate shape instead of the generally flat shape as depicted in FIG. 1.

Each end of chain 104 is attached to the backside of one of wing sections 110, 112 by a bolt 116 and a washer 118. Bolt 116 passes through washer 118 and a link in chain 104, and is passed through a hole (not depicted) in the backside of wing section 110, 112. Washer 118 is positioned between bolt 116 and chain 104. Bolt 118 is of a size appropriate to pass through a link in chain 104 and washer 118 is of a sufficient size to enable bolt 118 to securely fasten chain 104 to wing section 110, 112.

As depicted in FIG. 1, wing section 110, 112 comprises a cavity that generally extends from the top of wing section 10, 112 to the bottom of wing section 110, 112. A nut (not depicted) is positioned in the cavity of each wing section 110, 112 and receives bolt 116 to assist in securely fastening bolt 116, and chain 104, to the backsides of wing sections 110, 112. It is appreciated that, depending on the size of bolt 116 and, in particular, the size of the head of bolt 116, washer 118 may be omitted. It will also be appreciated that wing sections 110, 112 may comprise a threaded opening that is mated to receive bolt 116. In this instance, wing sections 110, 112 may not have the cavity and, furthermore, a nut is not needed to assist in securing bolt 116 to wing section 110, 112.

Chain 104 is attached to the backside of wing section 110, 112 at a location that is closer to the top of wing section 110, 112 than the bottom of wing section 110, 112. Stated differently, chain 104 is attached at a location somewhere in the upper half of wing section 110, 112. As shown in FIG. 1, chain 104 is attached approximately one-third of the distance from the top of wing section 110, 112 to the bottom of wing section 110, 112.

As will be further discussed below, attaching chain 104 in the upper half of wing section 110, 112 eases the cam action or rotation of tree stand receiver 102, which is performed to tighten tree stand receiving apparatus 10 about tree 106. Furthermore, when a suitable tree stand is properly affixed to tree stand receiving apparatus 10 (e.g., by inserting an appropriate member of the tree stand into aperture 114), the increased weight applied to the top of tree stand receiver 102 results in an increase in the tension of chain 104. The increased weight causes the tree stand receiver 102 to slide a small distance down the tree 106 thus tightening the chain 104 about the diameter of the tree 106. Additionally, the bottom of the front side of tree stand receiver 102 digs into or pierces tree 106, thus resulting in an increase in tension of chain 104. The increased tension on chain 104 about tree 106 allows the present invention to more securely support the tree stand in its intended position.

Chain 104 is of sufficient length to encircle most typical vertical supports and comprises a plurality of links, including at least one locking carabiner-type link or device. The carabiner-type link or device facilitates the adjustment of the length of chain 104 by interconnecting one of the plurality of links in chain 104. As shown in FIG. 1, the locking carabiner-type device is a quick link 120. Quick link 120 comprises a screw mechanism, which is appropriately rotated or turned to expose or close an opening in quick link 120. Therefore, quick link 120 can be opened to receive a different link in chain 104 and, once received, closed to secure the received link. It is appreciated that quick link 120 may comprise a locking mechanism different from the aforementioned screw mechanism, such as, by way of example and not limitation, a snap or a spring-loaded clip. It is also appreciated that appropriate fastening components other than chain 104 may be used such as, by way of example and not limitation, a cable having a plurality of loops dispersed throughout the length of the cable for interconnection with quick link 120.

The front sides of wing sections 110, 112 and aperture section 108 form the front or engaging side of tree stand receiver 102. When properly fastened and tightened about a tree or other cylindrical vertical support, some or all of the front side of tree stand receiver 102 makes contact with portions of the generally curved surface of the tree or other cylindrical vertical support. Moreover, the front side of tree stand receiver is shaped such that when attached or coupled to a tree stand, the bottom of the distal ends of wing sections 110, 112 which are away from aperture section 108 appropriately dig into or pierce the surface of the tree to provide further security and stability to the tree stand.

In FIG. 1 as well as other figures, tree stand receiver 102 is depicted as having aperture section 108 and wing sections 110, 112 of generally the same approximate height (i.e., length from top to bottom). Those of skill in the art will appreciate that this need not be the case, and that tree stand receiver 102 may be comprised of wing sections 110, 112 and aperture section 108 having different and varying heights. Additionally, as depicted in FIG. 1, the backside of wing sections 110, 112 are depicted as being offset from the backside of aperture section 108. Again, those of skill in the art will realize that the extent of any offset may vary or be eliminated all together.

Figure 2:
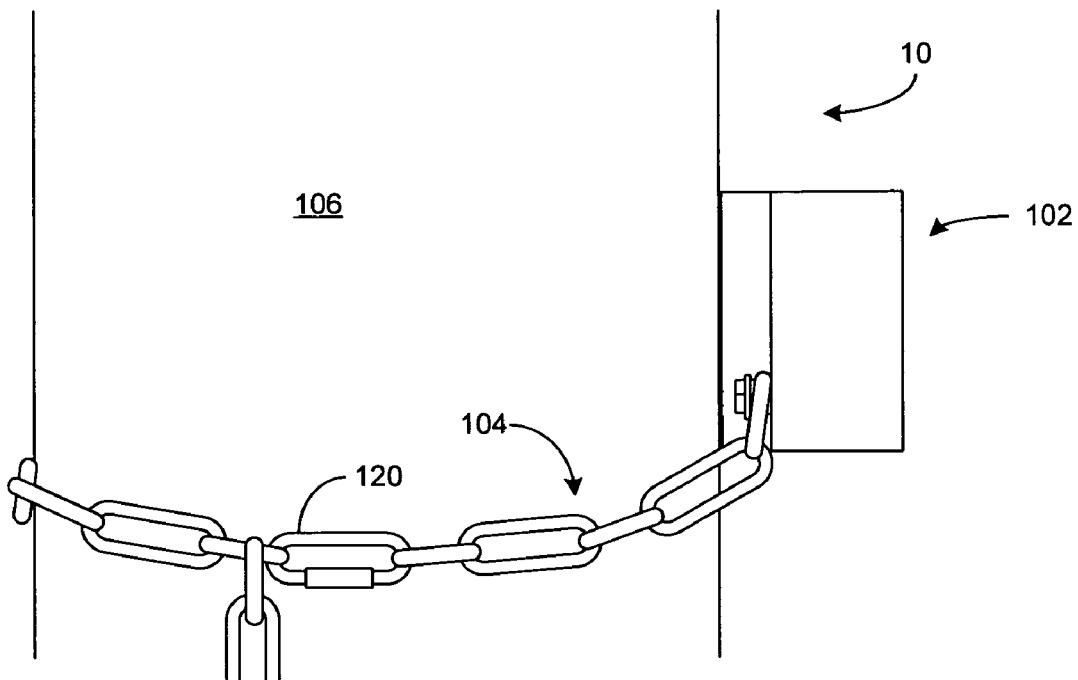
FIG. 2 illustrates the tree stand receiving apparatus of FIG. 1 fastened about a tree and before being tightened into a position to receive a suitable tree stand.
Figure 3:
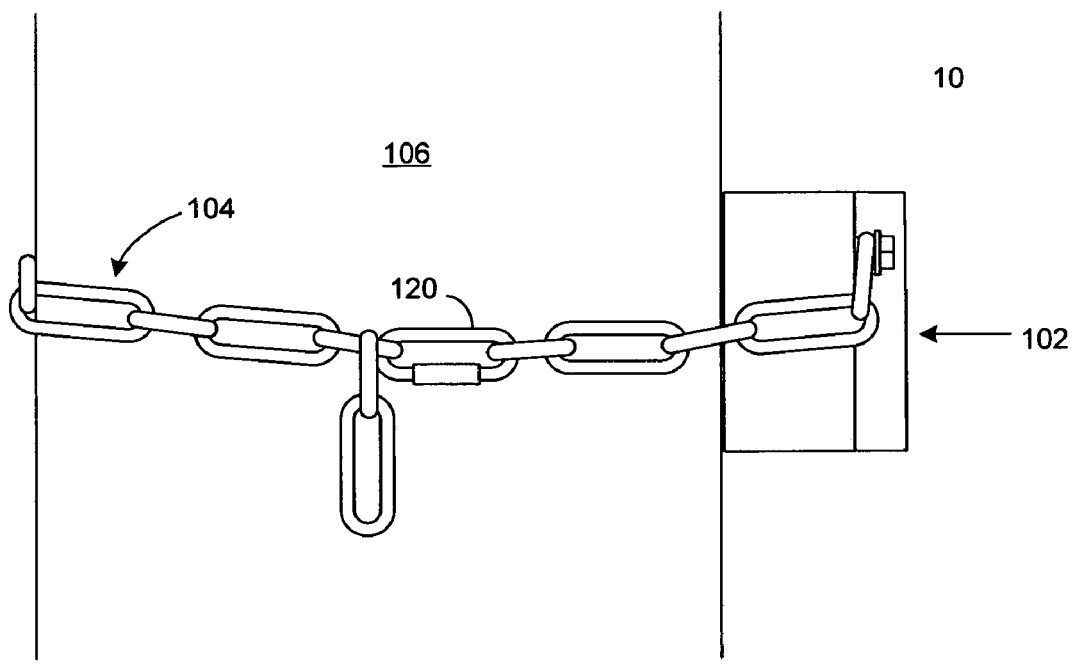
FIG. 3 illustrates the tree stand receiving apparatus of FIG. 1 fastened about the tree and tightened into a position to receive a suitable tree stand.

FIGS. 2 and 3 illustrate an exemplary process for fastening and tightening the tree stand receiving apparatus 10 of the present invention. FIG. 2 illustrates tree stand receiving apparatus 10 fastened about tree 106 before being tightened into a position to receive a suitable tree stand. A user, such as, for example, a hunter, transports tree stand receiving apparatus 10 to a suitable location in or about a tree 106. Upon reaching a suitable location to attach tree stand receiving apparatus 10 to tree 106, the user opens chain 104 by disconnecting quick link 120 and one of the links adjacent to and currently connected to quick link 120. The user turns tree stand receiver 102 upside-down (i.e., the top of tree stand receiver 102 faces downward toward the ground) and places the backside of tree stand receiver 102 against the outside of tree 106.

The user then drapes one segment of chain 104 (e.g., the longer segment of chain 104) around the outside of tree 106. The user then pulls the other segment of chain 104 (i.e., the segment with quick link 104) to the draped segment and fastens an appropriate one of the links in the draped segment to quick link 104 causing chain 104 to become appropriately sized (i.e., the length of chain 104 is adjusted) and taut about tree 106. When chain 104 is reconnected in this manner, tension is applied to chain 104 and tree stand receiver 102 becomes fastened about tree 106. When fastened in this manner and as can be seen in FIG. 2, a larger portion of tree stand receiver 102 is positioned or located above the point of attachment of chain 104 and tree stand receiver 102.

The user then cams (i.e., flips, rotates, etc.) tree stand receiver 102 about an axis extending substantially parallel to the top backside of tree stand receiver 102. The cam action is made easier because a larger portion of tree stand receiver 102 is located above the point of attachment of chain 104 and tree stand receiver 102. Worded another way, the cam action is made easier because chain 102 is attached to tree stand receiver 102 at a location that is closer to the top of tree stand receiver 102. The cam action causes the bottom backside of tree stand receiver 102 to pull away from tree 106 and toward the ground.

Once cammed in this manner, tree stand receiver 102 becomes positioned right side up (i.e., the top of tree stand receiver 102 faces upward toward the sky and away from the ground) and the front side of tree stand receiver 102 at least partly straddles tree 106 as is depicted in FIG. 3. Furthermore, the cam action causes the point of attachment of chain 104 and tree stand receiver 102 to be further distanced or separated (e.g., by approximately the length of the long bases of wing section 110, 112 of tree stand receiver 102) from tree 106. The cam action applies an additional pulling force on chain 104, which causes chain 104 to become more taut about tree 106, which causes tree stand receiver 102 to be further tightened about tree 106. When fastened and tightened in this manner, tree stand receiving apparatus 10 is ready to receive a suitable tree stand.

Figure 4:
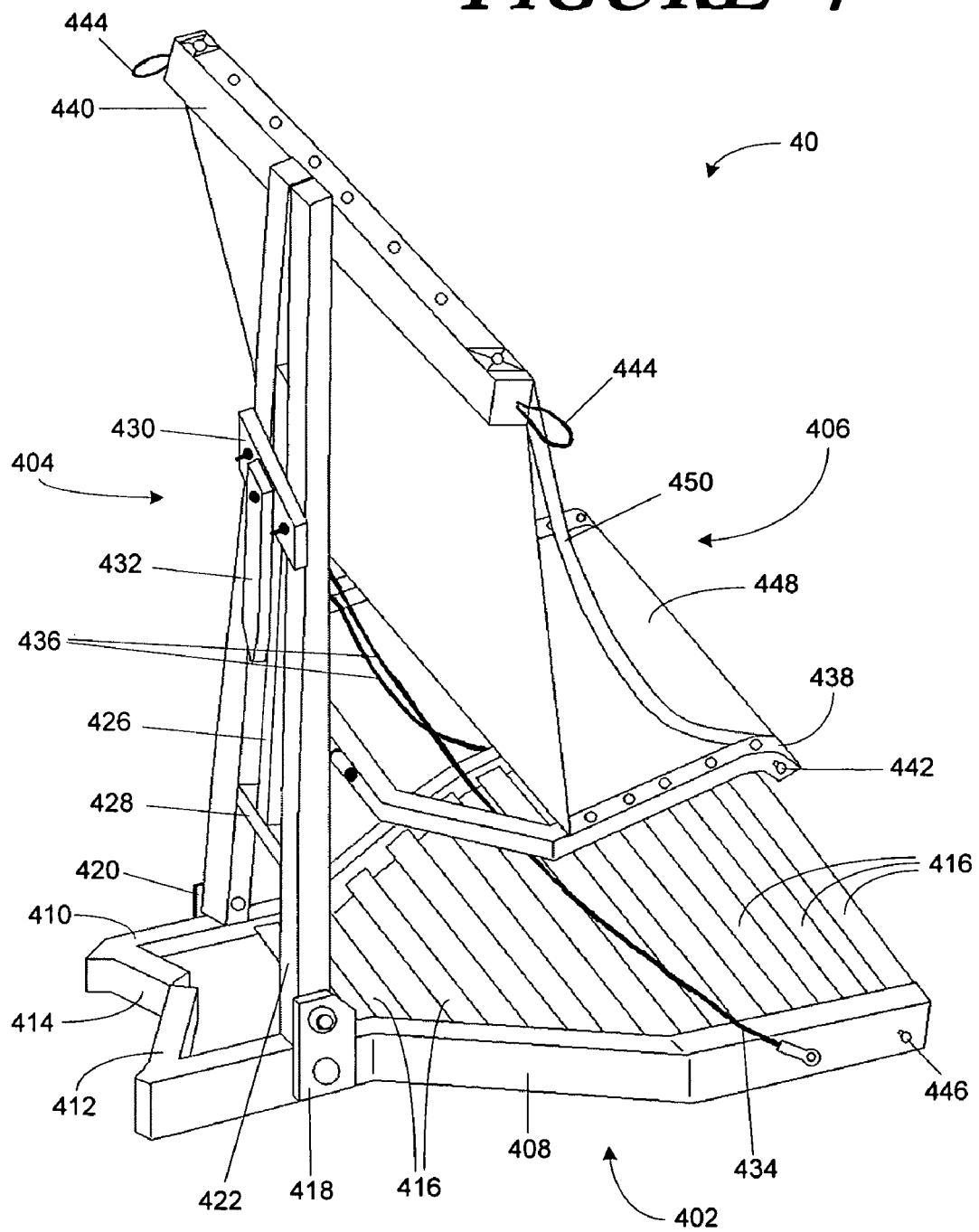
FIG. 4 illustrates a perspective view of an exemplary embodiment of a tree stand suitable for use with the tree stand receiving apparatus of FIG. 1.

FIG. 4 illustrates a perspective view of an exemplary embodiment of a tree stand 40 suitable for use with the tree stand receiving apparatus 10 of FIG. 1. Tree stand 40 comprises a platform assembly 402, seat back assembly 404, and seat assembly 406, and these assemblies may be formed from steel, aluminum, or alloy tubing or sheets. Platform assembly 402, seat back assembly 404, and seat assembly 406 can be made to pivot and fold upon one another into a compact arrangement to make tree stand 40 more portable and easy to store.

Platform assembly 402 functions to support a user when the user is in a standing position or the user's feet when the user is suitably seated upon seat assembly 406. Platform assembly 402 comprises side frame members 408, 410, back frame members 412, 414, and a plurality of slats 416. Side frame members 408, 410 and back frame members 412, 414 may be made from an appropriate tubular material or sheet material of sufficient thickness formed into a generally C-shaped cross section. The plurality of slats 416 may be made from an appropriate tubular or sheet material of sufficient thickness.

Each of the plurality of slats 416 extends between side frame members 408, 410. The distal ends of each of the plurality of slats 416 is mechanically bonded to the insides of side frame members 408, 410. Starting at one distal end, side frame members 408, 410 are separated from each other by a first width. Each of side frame members 408, 410 extends from the one distal end substantially separated to the other of side frame members 408, 410 by the first width for a certain length before tapering to a second width. Each of the side frame members 408, 410 then extends substantially separated to the other of side frame members 408, 410 by the second width before being closed by back frame members 412, 414.

Back frame members 412 and 414 close the side frame members 408, 410 by forming a generally V-shaped yoke. When tree stand 40 is properly affixed to tree receiving apparatus 10 as disclosed herein, back frame members 412, 414 bears directly against and at least partially straddles tree 106 or other vertical support.

A pair of brackets 418, 420 is mechanically bonded to side frame members 408, 410, respectively, near the region where side frame members 408, 410 finish tapering toward each other. Brackets 418, 420 are welded or otherwise mechanically attached, using mechanical fasteners such as, by way of example and not limitation, nuts and bolts, to its respective side frame members 408, 410. Seat back assembly 404 is pivotally attached to platform assembly 402 at brackets 418, 420, and is able to pivot between a raised position (as illustrated in FIG. 4) and a folded position.

Seat back assembly 402 comprises vertical frame members 422, 424, 426, cross beam 428, vertical coupling member support 430, and vertical coupling member 432. Vertical frame members 422, 424 are pivotally attached to brackets 418, 420, respectively, near one distal end of vertical frame members 422, 424. Vertical frame members 422, 424 taper and are mechanically bonded to each other at the distal ends opposite the distal ends that are pivotally attached to brackets 418, 420, thus, forming a generally inverted V-shape.

Cross beam 428 extends between and is mechanically bonded to vertical frame members 422, 424 at a region near each vertical frame member's 422, 424 point of pivotal attachment. Vertical frame member 426 generally extends vertically between vertical frame members 422, 424 from cross beam 428 toward the apex of the inverted V formed by vertical frame members 422, 424. One distal end of vertical frame member 426 is mechanically bonded to cross beam 428 and the area near the opposite distal end of vertical frame member 426 is mechanically bonded to the sides of vertical frame members 422, 424. Cross beam 428 and vertical frame member 426 generally provide support to vertical frame members 422, 424 and seat back assembly 402.

Vertical coupling member support 430 is mechanically bonded to the outer backsides of vertical frame members 422, 424 at a region above the midpoint of vertical frame members 422, 424. Vertical coupling member support 430 extends across vertical frame member 426. As depicted in FIG. 4, vertical coupling member support 430 is mechanically attached to vertical frame members 422, 424 by two nut-and-bolt assemblies. It is appreciated that vertical coupling member support 430 can also be mechanically bonded to vertical frame member 426 by, for example, welding.

Vertical coupling member 432 is mechanically bonded to, for example, by a bolt as depicted in FIG. 4, and extends generally downward from vertical coupling member support 430. Vertical coupling member 432 is attached to the side of vertical coupling member support 430 that is opposite the side attached to vertical frame members 422, 424, 426. Therefore, a gap is created between vertical coupling member 432 and vertical frame members 422, 424, 426 caused by the thickness of vertical coupling member support 430. This gap provides clearance for and enables vertical coupling member 432 to be inserted into aperture 114 of aperture section 108, thus, allowing tree stand 40 to be properly affixed to tree stand receiving apparatus 10 as disclosed herein.

Tension cables 434, 436 are mechanically attached to and extend between vertical frame members 422, 424 and side frame members 408, 410, respectively. Tension cables 434, 436 support seat back assembly 404 when in a raised position by becoming taut and, thus, prohibiting seat back assembly 404 from rotating substantially beyond a suitable and predetermined angle from platform assembly 402 when in a fully raised or unfolded position. Worded another way, tension cables 434, 436 enable seat back assembly 404 and platform assembly 402 to be properly positioned when in an unfolded position.

Figure 5:
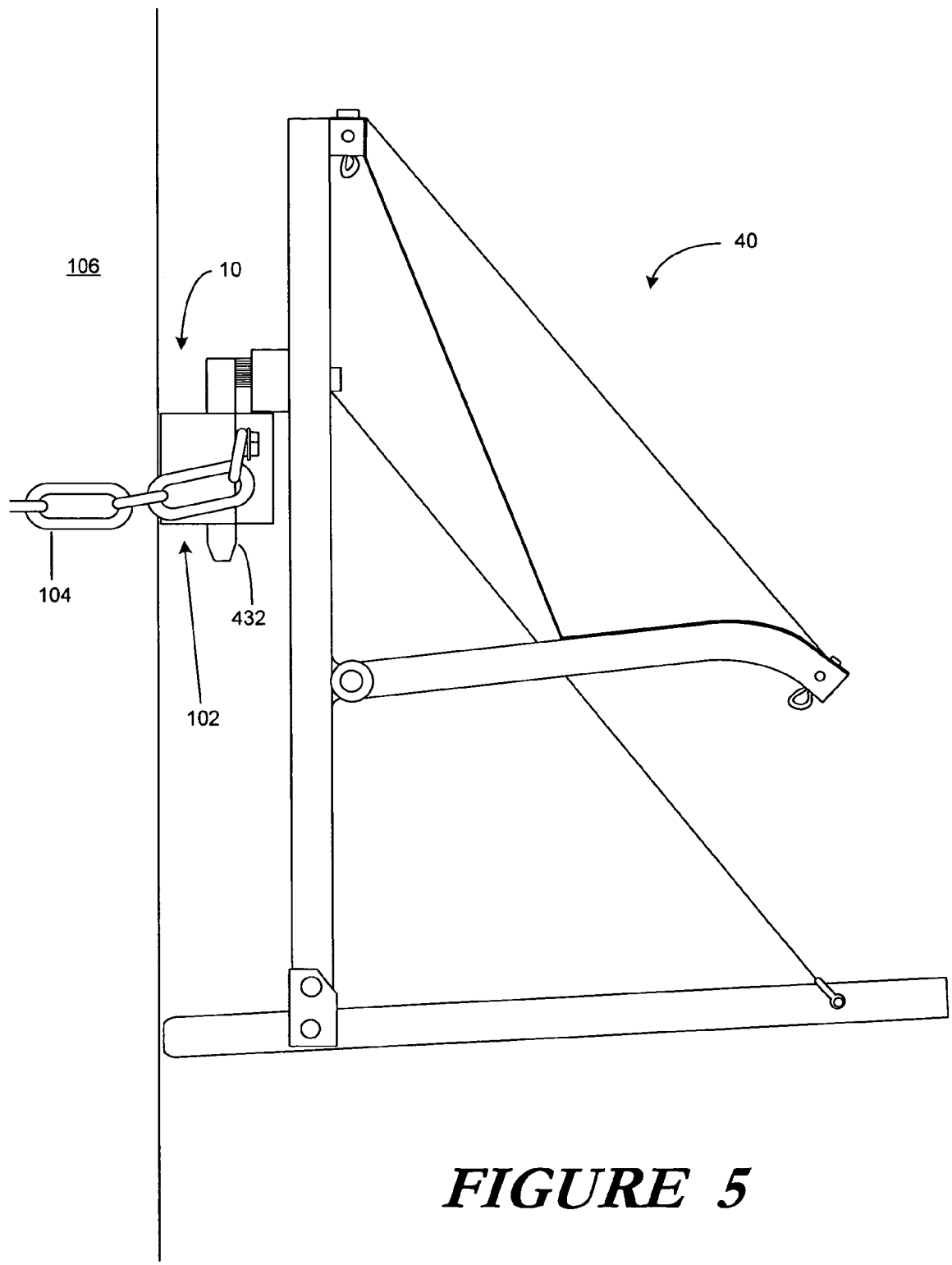
FIG. 5 illustrates the tree stand of FIG. 4 attached to the tree stand receiving apparatus of FIG. 1 in a fully unfolded position.
Figure 6:
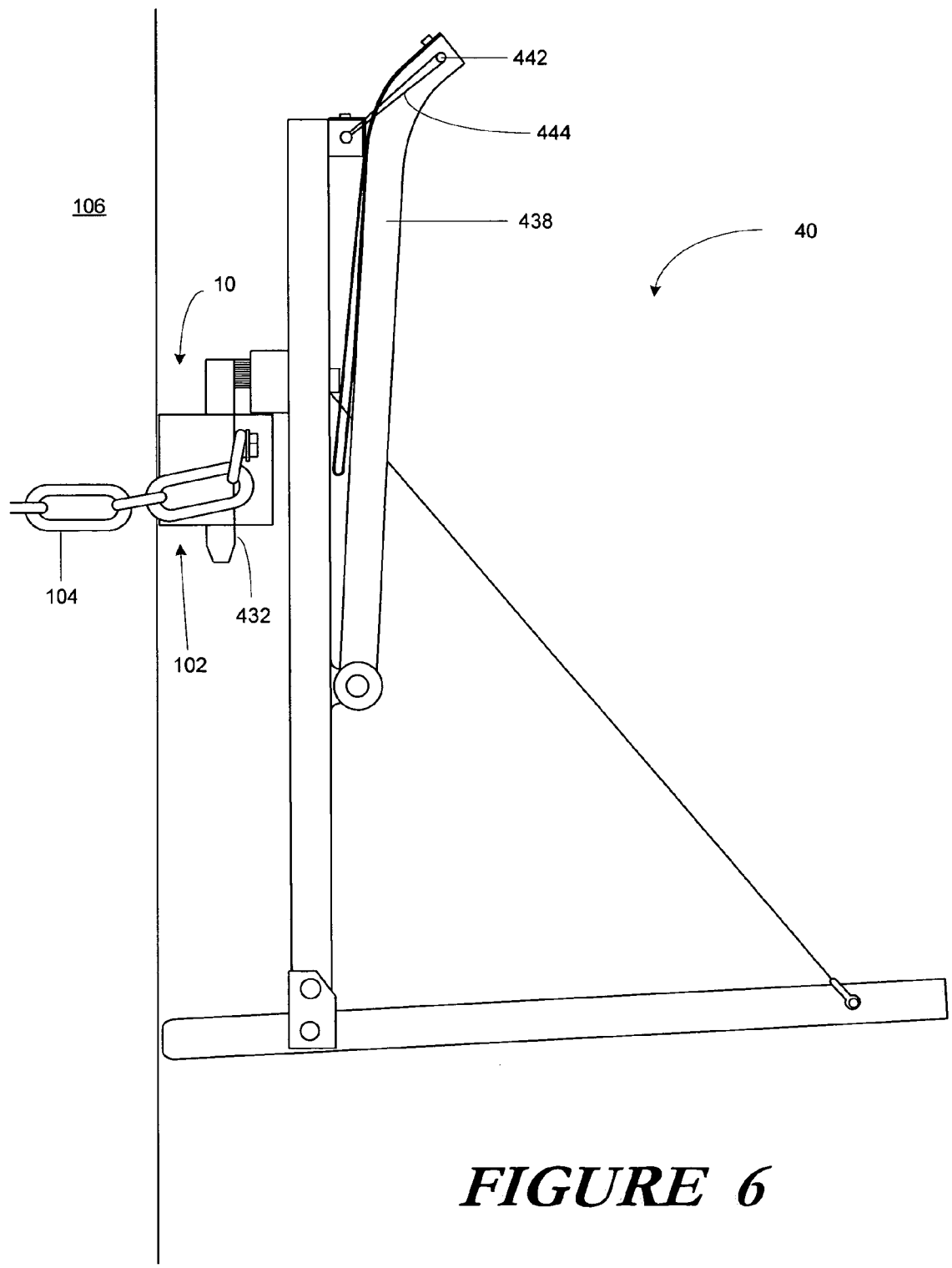
FIG. 6 illustrates the tree stand of FIG. 4 attached to the tree stand receiving apparatus of FIG. 1 with a seat assembly in a folded position.

Seat assembly 406 comprises a seat base frame 438 and a seat back support bar 440. Seat base frame 438 is generally a U-shaped structure having slightly tapered sides as they approach and form to the bottom of the generally U-shape. Seat base frame 438 is pivotally attached at the bottom of the generally U-shape to seat back assembly 404 using a hinge-like device. In particular, the hinge-like device is mechanically bonded to seat base frame 438 and vertical frame members 422, 424, 426 and enables seat base frame 438 to pivot between a folded or raised position (as depicted in FIG. 5) or an unfolded or open position (as depicted in FIGS. 4 and 6).

A pair of pin-like devices 442, for example, cleats, may be mechanically bonded to the outsides of seat base frame 438 (one pin-like device 442 on each side of seat base frame 438) near the open end of seat base frame member 438 opposite its point of pivotal attachment to seat back assembly 404. Pin-like devices 442 function to receive a loop or hook-like device in order to hold or maintain seat base frame 438 in a folded position. Pin-like device 442 preferably has a head that is larger in diameter than its middle, which enables pin-like device 442 to more readily retain the engaged loop or hook-like device. A seat bottom support bar (not shown) extends across seat base frame 438 near the open end of seat base frame 438. The seat bottom support bar functions to provide added support to seat assembly 406 and, in particular, seat base frame 438.

Seat back support bar 440 is mechanically bonded to seat back assembly 404 near the distal end of seat back assembly 404 opposite the end that is pivotally attached to brackets 418, 420. Seat back support bar 440 functions as a support frame for the back of seat assembly 406. A pair of loops 444 are mechanically attached to the distal ends (one loop 440 on each distal end) of seat back support bar 440. Loops 444 may be made from, for example and not limitation, a chord having elastic characteristics. Loops 444 function as a locking mechanism and each loop 444 is interconnected to or looped-around pin-like device 442 to hold seat base frame 438 in a folded position.

In one embodiment of tree stand 40, a pair of pin-like devices 446 is mechanically bonded to the outsides of platform assembly 402. In particular, one pin-like device 446 is mechanically attached to the outside of each side frame member 408, 410 near the distal ends of each side frame member 408, 410 opposite back frame members 412, 414. Pin-like devices 446 are similar to pin-like devices 442, and pin-like devices 446 function to receive a loop or hook-like device (i.e., loop 444) in order to hold or maintain platform assembly 402 and, in particular, tree stand 40 in a folded position.

Seat bottom and back support element 448 is mechanically attached to seat base frame 438 and seat back support bar 440. Seat bottom and back support element 448 may be comprised of duck material, canvas, vinyl-coated polyester such as TEXTILENE® or other appropriate material. Seat bottom and back support element 448 provides support to a user's seat bottom and back when the user is seated upon seat assembly 406 and can be mechanically attached to seat base frame 438 and seat back support bar 440 using a plurality of mechanical fasteners such as, by way of example and not limitation, a rivet-like device.

A pair of tension chords 450 is mechanically bonded near the distal ends (one tension chord 450 on each distal end) of seat back support bar 440 and each tension chord 450 extends between seat back support bar 440 and seat base frame 438. Tension chords 450 support seat base frame 438 when in an open or unfolded position by becoming taut and, thus, prohibiting seat base frame 438 from rotating substantially beyond a suitable and predetermined angle from seat back assembly 404. Worded another way, tension chords 450 enable seat base frame 438 and seat back assembly 404 to be properly positioned when in an unfolded position.

FIG. 5 illustrates tree stand 40 of FIG. 4 attached to tree stand receiving apparatus 10 of FIG. 1 in a fully unfolded position. As depicted, tree stand receiver 102 of tree stand receiving apparatus 10 is properly secured and tightened about tree 106 using chain 104 as disclosed herein. Tree stand 40 is then attached to tree stand receiving apparatus 10 by inserting vertical coupling member 432 into aperture 114 of tree stand receiver 102. When tree stand 40 is properly attached to tree stand receiving apparatus 10 in this manner and is fully unfolded, tree stand 40 in conjunction with tree stand receiving apparatus 10 provides a secure, stable, and safe seat upon which its user is able to sit.

FIG. 6 illustrates tree stand 40 of FIG. 4 attached to tree stand receiving apparatus 10 of FIG. 1 with seat assembly 406 in a folded position. As illustrated in FIG. 6, loops 444 are interconnected to pin-like devices 442 to hold seat base frame 438 in a folded position. When seat assembly 406 is in this folded position, tree stand 40 in conjunction with tree stand receiving apparatus 10 provides a secure, stable, and safe platform upon which its user is able to either stand or sit.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

What is claimed is:

1. A collapsible tree stand comprising:
a generally vertical frame member;
a platform pivotally connected to a bottom portion of the frame member such that the platform pivots in the vertical plane of motion;
a substantially U-shaped, open-fronted seat frame having a rear side pivotally attached to a middle portion of the generally vertical frame member such that the seat frame pivots in the vertical plane of motion;
a transverse sling bracket fixedly mounted to an upper portion of the generally vertical frame member;
a sling member with a first end and a second end, wherein the first end is affixed to the transverse sling bracket and the side edges of the second end are tautly affixed to the sides of the seat frame, thus forming back and seat support when the seat frame is in its extended position;
a coupling member vertically affixed to the rear of the vertical frame member having a downwardly extending free end; and
a tree stand mounting apparatus for receiving the downwardly extending free end of the coupling member and attachable to a tree or post.

2. The collapsible tree stand of claim 1, further comprising stop lanyards connected between the platform and the vertical frame member such that the stop lanyards arrest vertical rotation of the platform.

3. The collapsible tree stand of claim 1, further comprising stop straps connected between the transverse sling bracket and the seat frame to arrest downward rotation of the seat frame.

4. The collapsible tree stand of claim 1, further comprising a back frame member extending laterally from the bottom platform, wherein the back frame member comprises a generally vee-shaped recessed portion for partially receiving the tree or post.

5. The collapsible tree stand of claim 1, further comprising closing mechanisms on the distal edges of the platform, seat frame, and transverse sling bracket whereby said closing mechanisms are connectable to maintain the seat frame and/or platform in a closed position.

6. The collapsible tree stand of claim 1, wherein the tree stand mounting apparatus further comprises:
a central section and two adjacent angled wing sections wherein the central section has an aperture suitable for receiving the free bottom end of the coupling member for securing the tree stand to the tree or post;
a first and a second fastening component each having a first end and a second end where each of said first ends are affixed to a respective one of said angled wing sections, wherein said first and second fastening components are suitable for adjustable positioning about the tree or post;
wherein said first and said second fastening components when joined together form a loop about said tree or post, and wherein said first and second fastening components are joined together with a carabiner-type device secured at one of said second ends; and
wherein said loop is adjustable about said tree or post through the mutual securement of said first and second fastening components by use of said carabiner-type device at any point along their lengths.

7. The collapsible tree stand of claim 6, wherein the aperture of the tree stand mounting apparatus is a generally rectangular cavity.

8. The collapsible tree stand of claim 6, wherein the aperture of the tree stand mounting apparatus extends from the top of the tree stand mounting apparatus through the bottom of the tree stand mounting apparatus.

9. The collapsible tree stand of claim 6, wherein the first and second fastening component's first ends are affixed closer to the top of their respective wing sections.

10. The collapsible tree stand of claim 6, wherein the fastening component is a chain.

11. The collapsible tree stand of claim 6, wherein the fastening component is a cable.

12. The collapsible tree stand of claim 6, wherein said central section and said adjacent angled wing sections form a generally yoke shape suitable for at least partially straddling the tree or post.

13. The collapsible tree stand receiving apparatus of claim 6, wherein said angled wing sections secure said tree stand mounting apparatus from rotating about said tree or post.

14. A collapsible tree stand comprising:
a generally vertical frame member;
a platform pivotally connected to a bottom portion of the frame member such that the platform pivots in the vertical plane of motion;
a substantially U-shaped, open-fronted seat frame having a rear side pivotally attached to a middle portion of the generally vertical frame member such that the seat frame pivots in the vertical plane of motion;
a transverse sling bracket fixedly mounted to an upper portion of the generally vertical frame member;
a sling member with a first end and a second end, wherein the first end is affixed to the transverse sling bracket and the side edges of the second end are tautly affixed to the sides of the seat frame, thus forming back and seat support when the seat frame is in its extended position;
a coupling member vertically affixed to the rear of the vertical frame member having a downwardly extending free end;
stop lanyards connected between the platform and the vertical frame member such that the stop lanyards arrest rotation of the platform;
stop straps connected between the transverse sling bracket and the seat frame to arrest downward rotation of the seat frame;
a back frame member extending laterally from the bottom platform, wherein the back frame member comprises a generally vee-shaped recessed portion for partially receiving the tree or post;
closing mechanisms on the distal edges of the platform, seat frame, and transverse sling bracket where by said closing mechanisms are connectable to maintain the seat frame and/or platform in a closed position; and
a tree stand mounting apparatus for receiving the downwardly extending free end of the vertical coupling member and attachable to a tree or post, the tree stand mounting apparatus comprising:
a central section and two adjacent angled wing sections,
wherein the central section and said adjacent angled wing sections form a generally yoke shape suitable for at least partially straddling the tree or post; and
wherein said angled wing sections secure said tree stand mounting apparatus from rotating about said tree or post; and
wherein the central section has an aperture suitable for receiving the free bottom end of the vertical coupling member for securing the tree stand to the tree or post; and
wherein the aperture is a generally rectangular cavity and extends from the top of the tree stand mounting apparatus through the bottom of the tree stand mounting apparatus;
a first and a second fastening component each having a first end and a second end where each of said first ends are affixed to a respective one of said angled wing sections, wherein said first and second fastening components are suitable for adjustable positioning about the tree or post;
wherein said first and said second fastening components when joined together form a loop about said tree or post, and wherein said first and second fastening components are joined together with a carabiner-type device secured at one of said second ends; and
wherein said loop is adjustable about said tree or post through the mutual securement of said first and second fastening components by use of said carabiner-type device at any point along their lengths.

15. A collapsible tree stand comprising:
a generally vertical frame member comprising at least two angled vertical support members coupled together at their top portions to form an inverted "V";
a platform pivotally connected to a bottom portion of the frame member such that the platform pivots in the vertical plane of motion;
a substantially U-shaped, open-fronted seat frame having a rear side pivotally attached to a middle portion of the generally vertical frame member such that the seat frame pivots in the vertical plane of motion;
a transverse sling bracket fixedly mounted to an upper portion of the generally vertical frame member in front of the two angled vertical support members;
a sling member with a first end and a second end, wherein the first end is affixed to the transverse sling bracket and the side edges of the second end are tautly affixed to the sides of the seat frame, thus forming back and seat support when the seat frame is in its extended position, wherein the sides of the seat frame are angled downward at their forward ends;
a coupling member vertically affixed to the rear of the vertical frame member having a downwardly extending free end;
stop lanyards connected between the platform and the vertical frame member such that the stop lanyards arrest rotation of the platform;
stop straps connected between the transverse sling bracket and the seat frame to arrest downward rotation of the seat frame;
a back frame member extending laterally from the bottom platform, wherein the back frame member comprises a generally vee-shaped recessed portion for partially receiving the tree or post;
closing mechanisms on the distal edges of the platform, seat frame, and transverse sling bracket where by said closing mechanisms are connectable to maintain the seat frame and/or platform in a closed position; and
a tree stand mounting apparatus for receiving the downwardly extending free end of the vertical coupling member and attachable to a tree or post, the tree stand mounting apparatus comprising:

a central section and two adjacent angled wing sections,
  wherein the central section and said adjacent angled wing sections form a generally yoke shape suitable for at least partially straddling the tree or post; and
  wherein said angled wing sections secure said tree stand mounting apparatus from rotating about said tree or post; and
  wherein the central section has an aperture suitable for receiving the free bottom end of the vertical coupling member for securing the tree stand to the tree or post; and
  wherein the aperture is a generally rectangular cavity and extends from the top of the tree stand mounting apparatus through the bottom of the tree stand mounting apparatus;
a first and a second fastening component each having a first end and a second end where each of said first ends are affixed to a respective one of said angled wing sections, wherein said first and second fastening components are suitable for adjustable positioning about the tree or post;
  wherein said first and said second fastening components when joined together form a loop about said tree or post, and wherein said first and second fastening components are joined together with a carabiner-type device secured at one of said second ends; and
  wherein said loop is adjustable about said tree or post through the mutual securement of said first and second fastening components by use of said carabiner-type device at any point along their lengths;
a coupling member vertically affixed to the rear of the vertical frame member having a downwardly extending free end; and
a tree stand mounting apparatus for receiving the downwardly extending free end of the coupling member and attachable to a tree or post.

\* \* \* \* \*